United States Patent
Hosotani et al.

(10) Patent No.: US 8,404,767 B2
(45) Date of Patent: Mar. 26, 2013

(54) NITRILE GROUP-CONTAINING HIGHLY SATURATED COPOLYMER RUBBER

(75) Inventors: Daizo Hosotani, Tokyo (JP); Hiroyasu Nagamori, Tokyo (JP); Shinya Ikeda, Tokyo (JP)

(73) Assignee: Zeon Corporation, Tokyo (JP)

( * ) Notice: Subject to any disclaimer, the term of this patent is extended or adjusted under 35 U.S.C. 154(b) by 274 days.

(21) Appl. No.: 12/745,477

(22) PCT Filed: Dec. 26, 2008

(86) PCT No.: PCT/JP2008/073762
§ 371 (c)(1),
(2), (4) Date: May 28, 2010

(87) PCT Pub. No.: WO2009/082004
PCT Pub. Date: Jul. 2, 2009

(65) Prior Publication Data
US 2010/0305278 A1     Dec. 2, 2010

(30) Foreign Application Priority Data

Dec. 26, 2007    (JP) ................. 2007-334540

(51) Int. Cl.
*C08F 220/42*  (2006.01)
*C08F 220/44*  (2006.01)
*C08F 2/26*    (2006.01)
*C08L 9/02*    (2006.01)

(52) U.S. Cl. ........ 524/399; 524/284; 524/394; 524/400; 524/565; 524/773; 524/777; 524/850; 525/338; 525/328.2; 525/328.3; 525/329.1; 525/329.2; 525/329.3; 526/213; 526/216; 526/297; 526/341; 526/342

(58) Field of Classification Search ................. 524/284, 524/394, 399, 400, 565, 773, 777, 850; 525/338, 525/328.2, 328.3, 329.1, 329.2, 329.3; 526/213, 526/216, 297, 341, 342
See application file for complete search history.

(56) References Cited

U.S. PATENT DOCUMENTS

| | | | | |
|---|---|---|---|---|
| 2,579,908 A | * | 12/1951 | Davison et al. | 526/81 |
| 4,694,057 A | | 9/1987 | Smith et al. | |
| 5,244,955 A | * | 9/1993 | Toyoda | 524/397 |

FOREIGN PATENT DOCUMENTS

| | | |
|---|---|---|
| JP | 61-207409 A | 9/1986 |
| JP | 7-97507 A | 4/1995 |
| JP | 7-316211 A | 12/1995 |
| JP | 2002-179873 A | 6/2002 |
| JP | 2003-226780 A | 8/2003 |
| JP | 2007-161792 A | 6/2007 |

* cited by examiner

*Primary Examiner* — Roberto Rabago
(74) *Attorney, Agent, or Firm* — Birch, Stewart, Kolasch & Birch, LLP

(57) ABSTRACT

A nitrile group-containing highly saturated copolymer rubber having an iodine value of 80 or less and containing a caprate in 0.01 to 0.4 wt %. Preferably, the caprate is an alkaline earth metal caprate or Group XIII metal caprate. According to present invention, it is possible to provide a nitrile group-containing highly saturated copolymer rubber improved in mold fouling resistance while maintaining good normal state physical properties and heat resistance when being made into a cross-linked product.

9 Claims, No Drawings

NITRILE GROUP-CONTAINING HIGHLY SATURATED COPOLYMER RUBBER

TECHNICAL FIELD

The present invention relates to a nitrile group-containing highly saturated copolymer rubber, more particularly relates to a nitrile group-containing highly saturated copolymer rubber giving excellent mold fouling resistance while maintaining good normal state physical properties and heat resistance when made a cross-linked product.

BACKGROUND ART

Nitrile group-containing highly saturated copolymer rubber, typified by hydrogenated acrylonitrile-butadiene copolymer rubber, is superior in heat resistance, compression set resistance, and fuel oil resistance, so is being used around engines in large amounts as O-rings, gaskets, packings, and other seal members.

On the other hand, such nitrile group-containing highly saturated copolymer rubber has a problem that so-called "mold fouling" is occurred when being cross-linked using a mold in a molding process. That is, when cross-linked using a mold in an injection molding or other molding process, residue gradually deposits and builds up at a repeatedly used mold. As a result, there is the problem that even the obtained shaped product is fouled and a shaped product with excellent surface conditions can no longer be obtained. Therefore, the mold has to be cleaned at periodic intervals. This cleaning requires tremendous time and cost and becomes a major cause lowering productivity. Further, if using a release agent as a countermeasure to this, control of the amount of use of the release agent is difficult. Further, this ends up causing weld defect and other defects.

As opposed to this, for example, Patent Document 1 discloses, for improving the release property and mold fouling resistance, using a hydrogenated nitrile butadiene rubber composition comprised of hydrogenated nitrile butadiene rubber having a Mooney viscosity ($ML_{1+4}$, 100° C.) of 57.5 to 150 to which a fatty acid metal salt of zinc stearate or zinc laurate and a cross-linking agent of an organic peroxide have been added. However, in the method of this document, there were the inconveniences that zinc stearate or zinc laurate had to be newly added later and the effect of improvement of the mold fouling resistance was not sufficient.

Patent Document 1: Japanese Patent Publication (A) No. 2003-226780

DISCLOSURE OF THE INVENTION

Problem to be Solved by the Invention

The present invention has as its object the provision of a nitrile group-containing highly saturated copolymer rubber enabling improved mold fouling resistance while maintaining good normal state physical properties and heat resistance when made into a cross-linked product. Further, the present invention has as its object the provision of such a cross-linkable rubber composition comprised of this nitrile group-containing highly saturated copolymer rubber to which a cross-linking agent is added and a rubber cross-linked product obtained by cross-linking this cross-linkable rubber composition.

Means for Solving the Problems

The inventors engaged in intensive research to solve the above problem and as a result discovered that the above object can be achieved by a nitrile group-containing highly saturated copolymer rubber including a predetermined amount of a caprate and thereby completed the present invention.

That is, according to the present invention, there is provided a nitrile group-containing highly saturated copolymer rubber having an iodine value of 80 or less and containing a caprate in 0.01 to 0.4 wt %.

Preferably, the caprate is an alkaline earth metal caprate or Group XIII metal caprate, more preferably magnesium caprate or aluminum caprate.

Preferably, the nitrile group-containing highly saturated copolymer rubber is produced by coagulating a latex of a nitrile group-containing copolymer rubber obtained by emulsion polymerization using a caprate, then performing a hydrogenation reaction. Further, coagulation of the latex of the nitrile group-containing copolymer rubber is more preferably performed by using an alkaline earth metal salt or Group XIII metal salt.

Further, according to the present invention, there is provided a cross-linkable rubber composition containing any of the above nitrile group-containing highly saturated copolymer rubber and a cross-linking agent.

According to the present invention, there is provided a rubber cross-linked product obtained by cross-linking the above cross-linkable rubber composition. Note that, the above rubber cross-linked product is preferably used as a seal material.

Further, according to the present invention, there is provided a method of production of a nitrile group-containing highly saturated copolymer rubber having a step of emulsion polymerization using a caprate to obtain a latex of a nitrile group-containing copolymer rubber, a step of using an alkali earth metal salt or Group XIII metal salt to make the latex of the nitrile group-containing copolymer rubber coagulate to obtain a nitrile group-containing copolymer rubber, and a step of a hydrogenation reaction of the nitrile group-containing copolymer rubber.

Effects of the Invention

According to the present invention, it is possible to provide a nitrile group-containing highly saturated copolymer rubber enabling improved mold fouling resistance while maintaining good normal state physical properties and heat resistance when made into a cross-linked product.

BEST MODE FOR CARRYING OUT THE INVENTION

Nitrile Group-Containing Highly Saturated Copolymer Rubber

The nitrile group-containing highly saturated copolymer rubber of the present invention has an iodine value of 80 or less and contains a caprate in a range of 0.01 to 0.4 wt %.

The nitrile group-containing highly saturated copolymer rubber of the present invention (below, sometimes referred to as the "highly saturated nitrile rubber (A)") is formed by subjecting a specific nitrile group-containing copolymer rubber (below, sometimes referred to as the "nitrile rubber (a)") to a hydrogenation reaction to hydrogenate the carbon-carbon unsaturated bonds and adding a predetermined amount of a caprate to the rubber formed. Note that, the caprate also acts as an emulsifier, so when producing a nitrile rubber (a) by emulsion polymerization, by including the caprate as an emulsifier, it is possible to add it into the rubber and possible to eliminate the step of later addition of a caprate, so this is preferable.

The content of α,β-ethylenically unsaturated nitrile monomer units in the nitrile rubber (a) and highly saturated nitrile rubber (A) is, in the total monomer units, preferably 10 to 60 wt %, more preferably 15 to 55 wt %, particularly preferably 20 to 50 wt % in amount. If the content of the α,β-ethylenically unsaturated nitrile monomer units is too small, the obtained rubber cross-linked product is liable to drop in oil resistance, while conversely if too great, may drop in cold resistance.

The monomer forming the α,β-ethylenically unsaturated nitrile monomer units is not limited so long as an α,β-ethylenically unsaturated compound having nitrile groups. Acrylonitrile; α-chloroacrylonitrile, α-bromoacrylonitrile, or other α-halogenoacrylonitrile; methacrylonitrile or other α-alkyl acrylonitrile; etc. may be mentioned. Acrylonitrile and methacrylonitrile are preferable. A plurality of types of these α,β-ethylenically unsaturated nitrile monomers may also be used together.

The nitrile rubber (a) also usually includes, in addition to the above α,β-ethylenically unsaturated nitrile monomer units, diene monomer units and/or α-olefin monomer units so that the obtained rubber cross-linked product holds rubber elasticity.

As the diene monomer forming the diene monomer units, 1,3-butadiene, isoprene, 2,3-dimethyl-1,3-butadiene, 1,3-pentadiene, and other $C_4$ or more conjugated dienes; 1,4-pentadiene, 1,4-hexadiene, and other preferably $C_5$ to $C_{12}$ non-conjugated dienes may be mentioned. Among these, conjugated dienes are preferable, while 1,3-butadiene is more preferable.

As the α-olefin monomer forming the α-olefin monomer units, preferably a $C_2$ to $C_{12}$ one. Ethylene, propylene, 1-butene, 4-methyl-1-pentene, 1-hexene, 1-octene, etc. may be given as examples.

The content of the diene monomer units and/or α-olefin monomer units in the nitrile rubber (a) is, in the total monomer units, preferably 20 to 90 wt %, more preferably 30 to 85 wt %, particularly preferably 40 to 80 wt %. If the content of these monomer units in the nitrile rubber (a) is too small, the obtained rubber cross-linked product is liable to drop in elasticity, while if too great, the rubber cross-linked product may be impaired in oil resistance, heat aging resistance, stability of chemical resistance, etc.

The nitrile rubber (a) may further contain units of other monomers able to copolymerize with the α,β-ethylenically unsaturated nitrile monomer and, diene monomer and/or α-olefin monomer. As monomers forming the other monomer units, α,β-ethylenically unsaturated carboxylic acid ester monomers, α,β-ethylenically unsaturated carboxylic acid monomers, α,β-ethylenically unsaturated polyvalent carboxylic acid anhydride monomers, aromatic vinyl monomers, fluorine-containing vinyl monomers, copolymerizable antiaging agents, etc. may be mentioned.

As the α,β-ethylenically unsaturated carboxylic acid ester monomer, for example, methyl acrylate, ethyl acrylate, propyl acrylate, butyl acrylate, n-dodecyl acrylate, methyl methacrylate, ethyl methacrylate, and other acrylic acid alkyl esters and methacrylic acid alkyl esters with $C_1$ to $C_{18}$ alkyl groups; methoxymethyl acrylate, methoxyethyl methacrylate, and other acrylic acid alkoxyalkyl esters and methacrylic acid alkoxyalkyl esters with $C_2$ to $C_{12}$ alkoxyalkyl groups; α-cyanoethyl acrylate, β-cyanoethyl acrylate, cyanobutyl methacrylate, and other acrylic acid cyanoalkyl esters and methacrylic acid cyanoalkyl esters with $C_2$ to $C_{12}$ cyanoalkyl groups; 2-hydroxyethyl acrylate, 2-hydroxyethyl methacrylate, 3-hydroxypropyl acrylate, and other acrylic acid hydroxyalkyl esters and methacrylic acid hydroxyalkyl esters with $C_1$ to $C_{12}$ hydroxyalkyl groups; fluorobenzyl acrylate, fluorobenzyl methacrylate, and other fluorine-substituted benzyl-group containing acrylic acid esters and fluorine-substituted benzyl-group containing methacrylic acid esters; trifluoroethyl acrylate, tetrafluoropropyl methacrylate, and other fluoroalkyl-group containing acrylic acid esters and fluoroalkyl-group containing methacrylic acid esters; dimethyl maleate, dimethyl fumarate, dimethyl itaconate, diethyl itaconate, and other unsaturated polyvalent carboxylic acid polyalkyl esters; dimethylaminomethyl acrylate, diethylaminoethyl acrylate, and other amino-group containing α,β-ethylenically unsaturated carboxylic acid esters; etc. may be mentioned.

As the α,β-ethylenically unsaturated carboxylic acid monomers, for example, acrylic acid, methacrylic acid, and other α,β-ethylenically unsaturated monocarboxylic acids; maleic acid, fumaric acid, itaconic acid, and other α,β-ethylenically unsaturated polyvalent carboxylic acids; monomethyl maleate, monoethyl maleate, monopropyl maleate, mono n-butyl maleate, and other maleic acid monoalkyl esters, monocyclopentyl maleate, monocyclohexyl maleate, monocycloheptyl maleate, and other maleic acid monocycloalkyl esters, monomethylcyclopentyl maleate, monoethylcyclohexyl maleate, and other maleic acid monoalkyl cycloalkyl esters, monomethyl fumarate, monoethyl fumarate, monopropyl fumarate, mono n-butyl fumarate, and other fumaric acid monoalkyl esters, monocyclopentyl fumarate, monocyclohexyl fumarate, monocycloheptyl fumarate, and other fumaric acid monocycloalkyl esters, monomethylcyclopentyl fumarate, monoethylcyclohexyl fumarate, and other fumaric acid monoalkyl cycloalkyl esters, monomethyl citraconate, monoethyl citraconate, monopropyl citraconate, mono n-butyl citraconate, and other citraconic acid monoalkyl esters, monocyclopentyl citraconate, monocyclohexyl citraconate, monocycloheptyl citraconate, and other citraconic acid monocycloalkyl esters, monomethylcyclopentyl citraconate, monoethylcyclohexyl citraconate, and other citraconic acid monoalkyl cycloalkyl esters, monomethyl itaconate, monoethyl itaconate, monopropyl itaconate, mono n-butyl itaconate, and other itaconic acid monoalkyl esters, monocyclopentyl itaconate, monocyclohexyl itaconate, monocycloheptyl itaconate, and other itaconic acid monocycloalkyl esters, monomethylcyclopentyl itaconate, monoethylcyclohexyl itaconate, and other itaconic acid monoalkyl cycloalkyl esters, and other partial esters of α,β-ethylenically unsaturated polyvalent carboxylic acids, etc. may be mentioned.

As the α,β-ethylenically unsaturated polyvalent carboxylic acid anhydride monomer, for example, maleic anhydride etc. may be mentioned.

As the aromatic vinyl monomer, styrene, α-methylstyrene, vinylpyridine, etc. may be mentioned.

As the fluorene-containing vinyl monomer, fluoroethylvinyl ether, fluoropropylvinyl ether, o-trifluoromethylstyrene, vinyl pentafluorobenzoate, difluoroethylene, tetrafluoroethylene, etc. may be mentioned.

As the copolymerizable antiaging agent, N-(4-anilinophenyl) acrylamide, N-(4-anilinophenyl)methacrylamide, N-(4-anilinophenyl) cinnamamide, N-(4-anilinophenyl)crotonamide, N-phenyl-4-(3-vinylbenzyloxy)aniline, N-phenyl-4-(4-vinylbenzyloxy)aniline, etc. may be mentioned.

As other monomers able to be copolymerized, several types may also be used together. The content of these other monomer units in the nitrile rubber (a) is, in the entire monomer units as 100 wt %, preferably 70 wt % or less, more preferably 55 wt % or less, still more preferably 40 wt % or less, particularly preferably 10 wt % or less.

The highly saturated nitrile rubber (A) of the present invention has an iodine value of 80 or less, preferably 60 or less, more preferably 40 or less, particularly preferably 30 or less. If the highly saturated nitrile rubber (A) is too high in iodine value, the obtained rubber cross-linked product is liable to drop in heat aging resistance or ozone resistance.

The content of the caprate in the highly saturated nitrile rubber (A) is, with respect to the weight of the entire highly saturated nitrile rubber (A), 0.01 to 0.4 wt %, preferably 0.03 to 0.3 wt %, more preferably 0.05 to 0.2 wt %. If the content of the caprate is less than the above range, the mold fouling resistance deteriorates. Further, if the content of the caprate is too great, the mold fouling resistance deteriorates, bleeding occurs, or, when used as a seal member for an alcohol-containing solution, precipitate derived from the caprate is formed and causes clogging. As the caprate, sodium caprate (capric acid is also referred to as "decanoic acid".), potassium caprate, and other alkali metal caprates; magnesium caprate, calcium caprate, and other alkaline earth metal caprates; aluminum caprate and other Group XIII metal caprates (salts of capric acid and metal belonging to Group XIII of the Long Form of the Periodic Table); and ammonium caprate may be mentioned. Among these in particular, due to the effect of the present invention becoming much more remarkable, alkaline metal caprates, alkaline earth metal caprates, and Group XIII metal caprates are preferable, alkaline earth metal caprates and Group XIII metal caprates are more preferable, and alkaline earth metal caprates are particularly preferable. Note that, as an alkaline metal caprate, potassium caprate is preferable, as an alkaline earth metal caprate, magnesium caprate is preferable, and as a Group XIII metal caprate, aluminum caprate is preferable.

The Mooney viscosity of the nitrile rubber (a) [$ML_{1+4}$(100° C.)] is preferably 10 to 100, more preferably 15 to 80, particularly preferably 20 to 75. If outside this range, the Mooney viscosity of the highly saturated nitrile rubber (A) obtained by hydrogenation is liable to become unsuitable. The Mooney viscosity of the nitrile rubber (a) can be adjusted by suitably selecting the amount of the molecular weight adjuster, the polymerization reaction temperature, the polymerization initiator concentration, or other conditions.

Further, the Mooney viscosity of the highly saturated nitrile rubber (A) [$ML_{1+4}$(100° C.)] is preferably 15 to 200, more preferably 30 to 150, particularly preferably 45 to 120. If the Mooney viscosity of the highly saturated nitrile rubber (A) is too low, the obtained cross-linked product is liable to drop in mechanical properties, while conversely if too high, the workability when adding a cross-linking agent to obtain a cross-linkable rubber composition may fall.

The highly saturated nitrile rubber (A) is preferably produced by copolymerizing the above-mentioned monomer by emulsion polymerization using an emulsifier to prepare a latex of the nitrile rubber (a) and hydrogenating this.

In the present invention, as the emulsifier, use of an alkaline metal caprates is preferable. Particularly, when including a caprate in highly saturated nitrile rubber (A), by introducing the alkaline metal caprates as an emulsifier and performing emulsion polymerization using the alkaline metal caprates as the emulsifier to prepare a latex of the nitrile rubber (a), the effects of the present invention can be enhanced. That is, it is possible to make the highly saturated nitrile rubber (A) give more superior mold fouling resistance.

The amount of the emulsifier used, with respect to the total monomer as 100 parts by weight, is preferably 1 to 10 parts by weight, more preferably 1 to 5 parts by weight, particularly preferably 1.5 to 3 parts by weight. If the amount of the emulsifier used is too small, the stability of the latex will fall and the emulsion polymerization reaction will no longer be possible in some cases. On the other hand, if the amount of the emulsifier used is too large, the content of the emulsifier in the highly saturated nitrile rubber (A) after hydrogenation will become greater and a new step of removal of the emulsifier will have to be added in some cases. Further, when using a alkaline metal caprates as an emulsifier, it can be adjusted so that the amount of caprate in the highly saturated nitrile rubber (A) finally obtained in the later explained step after emulsion polymerization becomes the above range. Note that, for example, even when using potassium caprate as the alkaline metal caprates (emulsifier), the metal derived from the magnesium sulfate or other coagulant used for the coagulation and the potassium used as the alkali metal will switch and the alkaline metal caprates in the saturated highly nitrile rubber (A) will not necessarily be present in the form of potassium caprate or other alkaline metal caprates. For example, when using magnesium sulfate as the coagulant, usually this is present not in the form of an alkaline metal caprate, but magnesium caprate as an alkaline earth metal caprates.

In the emulsion polymerization, other than an emulsifier, a polymerization initiator, molecular weight adjuster, and other conventional known secondary materials for polymerization may be used. The method of addition these secondary materials for polymerization is not particularly limited. The method of addition all together at the start of polymerization, the method of addition divided into batches, the method of continuous addition, or any other method may be employed.

The polymerization initiator is not particularly limited so long as a radical initiator, but potassium persulfate, sodium persulfate, ammonium persulfate, potassium perphosphate, hydrogen peroxide, and other inorganic peroxides; t-butyl peroxide, cumen hydroperoxide, p-mentane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, t-butylperoxyisobutyrate, and other organic peroxides; azobis(isobutyronitrile), azobis (2,4-dimethylvaleronitrile, azobis(cyclohexane carbonitrile), azobis(methyl isobutyrate), or other azo compounds etc. may be mentioned. These polymerization initiators may be used alone or in combinations of two or more types. As the polymerization initiator, an inorganic or organic peroxide is preferable.

When using a peroxide as the polymerization initiator, it may also be used as a redox type polymerization initiator in combination with sodium bisulfite, ferrous sulfate, or another reducing agent.

The amount of the polymerization initiator used, with respect to the total monomer as 100 parts by weight, is preferably 0.01 to 2 parts by weight, more preferably 0.05 to 1.5 parts by weight.

The molecular weight adjuster is not particularly limited, but t-dodecyl mercaptan, n-dodecyl mercaptan, octyl mercaptan, and other mercaptans; carbon tetrachloride, methylene chloride, methylene bromide, and other halogenated hydrocarbons; α-methylstyrene dimer; tetraethyl thiuram disulfide, dipentamethylene thiuram disulfide, diisopropyl xanthogen disulfide, and other sulfur-containing compounds etc. may be mentioned. These may be used alone or in combinations of two or more types. Among these, mercaptans are preferable, while t-dodecyl mercaptan is more preferable.

The amount of the molecular weight adjuster used, with respect to the total monomer as 100 parts by weight, is preferably 0.1 to 0.8 parts by weight, more preferably 0.2 to 0.7 parts by weight in range.

The medium of the emulsion polymerization used is usually water. The amount of water is, with respect to the total monomer as 100 parts by weight, preferably 80 to 500 parts by weight, more preferably 100 to 300 parts by weight.

At the time of emulsion polymerization, further, in accordance with need, a chelating agent, dispersant, pH adjuster, deoxidizing agent, particle size adjuster, and other secondary materials for polymerization may be used. When using these, the types and amounts used are not particularly limited.

The highly saturated nitrile rubber (A) of the present invention is produced by subjecting the nitrile rubber (a) obtained by the above emulsion polymerization to a hydrogenation reaction. At the time of this hydrogenation reaction, if hydrogenating even the nitrile groups, the obtained rubber cross-linked product will end up falling in oil resistance, so it is necessary to selectively hydrogenate only the carbon-carbon unsaturated bonds.

As this selective hydrogenation, any known method may be used. Either of the oil layer hydrogenation method or the aqueous layer hydrogenation method is possible, but since the content of the emulsifier in the highly saturated nitrile rubber (A) can be lowered, the oil layer hydrogenation method is preferable.

When producing the highly saturated nitrile rubber (A) by the oil layer hydrogenation method, it is preferably produced by the following method.

That is, first, a latex of the nitrile rubber (a) prepared by the emulsion polymerization is made to coagulate by salting out, then the result is filtered, dried, then dissolved in an organic solvent. Next, the nitrile rubber (a) dissolved in the organic solvent is subjected to a hydrogenation reaction (oil layer hydrogenation method) to obtain a hydrogenation product and the obtained hydrogenation product solution is coagulated, filtered, and dried to obtain the highly saturated nitrile rubber (A).

Note that, when using an alkaline metal caprates as the emulsifier, in each step of coagulation of the latex of the nitrile rubber (a) by salting out, filtration, and drying, it is preferable to make adjustments so that the amount of caprate in the finally obtained highly saturated nitrile rubber (A) becomes the above range. For example, in the coagulation of the latex by salting out, magnesium sulfate, sodium chloride, calcium chloride, aluminum sulfate, or another known coagulating agent may be used, but by using magnesium sulfate, magnesium chloride, magnesium nitrate, or other alkali earth metal salt or aluminum sulfate or other Group XIII metal salt, it is possible to reduce the amount of caprate contained in the nitrile rubber (a). For this reason, as the coagulant, it is preferable to use an alkali earth metal salt or Group XIII metal salt and more preferable to use an alkali earth metal salt. By controlling the amount of use or coagulation temperature, it is possible to make the amount of caprate in the finally obtained highly saturated nitrile rubber (A) the above range. The amount of the coagulant used, when making the amount of the nitrile rubber (a) hydrogenated 100 parts by weight, is preferably 1 to 100 parts by weight, more preferably 5 to 50 parts by weight, particularly preferably 10 to 50 parts by weight. The coagulation temperature is preferably 10 to 80° C.

The solvent of the oil layer hydrogenation method is not particularly limited so long as a liquid organic compound dissolving the nitrile rubber (a), but benzene, toluene, xylene, hexane, cyclohexane, tetrahydrofuran, methylethylketone, ethyl acetate, cyclohexanone, acetone, etc. are preferably used.

As a catalyst for the oil layer hydrogenation method, any known selective hydrogenation catalyst may be used without limitation. A palladium-based catalyst and a rhodium-based catalyst are preferable. A palladium-based catalyst (palladium acetate, palladium chloride, palladium hydroxide, etc.) is more preferable. These may be used in combinations of two or more types as well, but when combining a rhodium-based catalyst and a palladium-based catalyst for use, making the palladium-based catalyst the main active ingredient is preferable. These catalysts are normally used carried on a carrier. As the carrier, silica, silica-alumina, alumina, diatomite, activated carbon, etc. may be mentioned. The amount of the catalyst used is, with respect to the amount of the nitrile rubber (a) to be hydrogenated, converted to the amount of metal of the hydrogenation catalyst, preferably 10 to 5000 weight ppm, more preferably 100 to 3000 weight ppm.

The hydrogenation reaction temperature in the oil layer hydrogenation method is preferably 0 to 200° C., more preferably 10 to 100° C., while the hydrogen pressure is preferably 0.1 to 30 MPa, more preferably 0.2 to 20 MPa. The reaction time is preferably 1 to 50 hours, more preferably 2 to 25 hours.

Alternatively, when producing the highly saturated nitrile rubber (A) by the aqueous layer hydrogenation method, it is preferable to add water as required to the latex of the nitrile rubber (a) obtained by emulsion polymerization so as to dilute it and then perform the hydrogenation reaction.

Here, the aqueous layer hydrogenation method includes the (I) aqueous layer direct hydrogenation method performing the hydrogenation by providing hydrogen to the reaction system in the presence of a hydrogenation catalyst and the (II) aqueous layer indirect hydrogenation method performing the hydrogenation by reduction in the presence of an oxidizing agent, reducing agent, and activating agent.

In the (I) aqueous layer direct hydrogenation method, the concentration of the nitrile rubber (a) of the aqueous layer (concentration in the latex state) is preferably 40 wt % or less for preventing agglomeration.

Further, the hydrogenation catalyst used is not particularly limited so long as a compound resistant to decomposition in water. As specific examples of the hydrogenation catalyst, among palladium catalysts, palladium salts of formic acid, propionic acid, lauric acid, succinic acid, oleic acid, phthalic acid, and other carboxylic acids; palladium chloride, dichloro (cycloctadiene) palladium, dichloro(norbornadiene) palladium, ammonium hexachloropalladium (IV), or other palladium chlorides; palladium iodide and other iodides; palladium sulfate dihydrate etc. may be mentioned. Among these, palladium salts of carboxylic acid, dichloro(norbornadiene) palladium, and ammonium hexachloropalladium (IV) are particularly preferable. The amount of the hydrogenation catalyst used may be suitably determined, but is preferably 5 to 6000 weight ppm, more preferably 10 to 4000 weight ppm, with respect to the amount of the nitrile rubber (a) to be hydrogenated, converted to the amount of metal of the hydrogenation catalyst.

The reaction temperature in the aqueous layer direct hydrogenation method is preferably 0 to 300° C., more preferably 20 to 150° C., particularly preferably 30 to 100° C. If the reaction temperature is too low, the reaction rate is liable to drop, while conversely if too high, hydrogenation of the nitrile groups or other secondary reactions may occur. The hydrogen pressure is preferably 0.1 to 30 MPa, more preferably 0.5 to 20 MPa. The reaction time is selected considering the reaction temperature, hydrogen pressure, target hydrogenation rate, etc.

In the aqueous layer direct hydrogenation method, after the end of the reaction, the hydrogenation catalyst in the latex is removed. As the method for this, for example, the method of adding activated carbon, an ion exchange resin, or other adsorbent and stirring to adsorb the hydrogenation catalyst, then filtering or centrifugally separating the latex may be employed. Alternatively, it is possible not to remove the hydrogenation catalyst, but leave it in the latex.

(II) On the other hand, in the aqueous layer indirect hydrogenation method, the concentration of the nitrile rubber (a) of the aqueous layer (concentration in latex state) is preferably 1 to 50 wt %, more preferably 1 to 40 wt %.

As the oxidizing agent used in the aqueous layer indirect hydrogenation method, oxygen, air, hydrogen peroxide, etc. may be mentioned. The amount of these oxidizing agents used is, by molar ratio with respect to the carbon-carbon double bonds (oxidizing agent:carbon-carbon double bonds), preferably 0.1:1 to 100:1, more preferably 0.8:1 to 5:1 in range.

As the reducing agent used in the aqueous layer indirect hydrogenation method, hydrazine, hydrazine hydrate, hydrazine acetate, hydrazine sulfate, hydrazine hydrochloride, or other hydrazines or compounds releasing hydrazine may be used. The amount of these reducing agents used is, by molar ratio with respect to the carbon-carbon double bonds (reducing agent:carbon-carbon double bonds), preferably 0.1:1 to 100:1, more preferably 0.8:1 to 5:1 in range.

As the activating agent used in the aqueous layer indirect hydrogenation method, ions of copper, iron, cobalt, lead, nickel, iron, tin, or other metals may be used. The amount of these activating agents used is, by molar ratio with respect to the carbon-carbon double bonds (activating agent:carbon-carbon double bonds), preferably 1:1000 to 10:1, more preferably 1:50 to 1:2.

The reaction in the aqueous layer indirect hydrogenation method is performed by heating in a range from 0° C. to the reflux temperature. Due to this, a hydrogenation reaction is performed. The range of heating in this case is preferably 0 to 250° C., more preferably 20 to 100° C., particularly preferably 40 to 80° C.

In both the direct hydrogenation method and indirect hydrogenation method in the aqueous layer, after the hydrogenation, coagulation by salting out, filtration, and drying are preferably performed. The salting out, in the same way as the salting out of the latex of the nitrile rubber (a) in the oil layer hydrogenation method, is preferably performed using the above-mentioned alkali earth metal salt or Group XIII metal salt for controlling the amount of caprate in the highly saturated nitrile rubber (A) after hydrogenation. Use of the above-mentioned alkali earth metal salts is particularly preferable. Further, the filtration and drying steps after the coagulation may be performed by respectively known methods.

Cross-linkable Rubber Composition

The cross-linkable rubber composition of the present invention is comprised of the above highly saturated nitrile rubber (A) into which a cross-linking agent is blended.

As the cross-linking agent, any known rubber cross-linking agent can be used, but a sulfur-based cross-linking agent, organic peroxide-based cross-linking agent, or polyamine-based cross-linking agent is preferable. Note that, a polyamine-based cross-linking agent is preferable for a highly saturated nitrile rubber (A) containing carboxyl groups.

As a sulfur-based cross-linking agent, powdered sulfur, precipitated sulfur, or other sulfur; 4,4'-dithiomorpholine or tetramethyl thiuram disulfide, tetraethyl thiuram disulfide, high molecular weight polysulfides or other organic sulfur compounds; etc. may be mentioned.

As an organic peroxide-based cross-linking agent, α,α-bis[t-butylperoxy]diisopropyl benzene, dicumyl peroxide, di-t-butyl peroxide, or other dialkyl peroxides; benzoyl peroxide, isobutyryl peroxide, or other diacyl peroxides; 2,5-dimethyl-2,5-bis(benzoylperoxy)hexane, t-butyl peroxyisopropyl carbonate or other peroxy esters; etc. may be mentioned.

As the polyamine-based cross-linking agent, there is a compound having two or more amino groups where a plurality of hydrogen atoms of the aliphatic hydrocarbons or aromatic hydrocarbons are substituted by amino groups or hydrazide structures, that is, structures represented by —CONHNH$_2$ (where "CO" is a carbonyl group). As specific examples, for example, hexamethylene diamine, hexamethylene diamine carbamate, tetramethylene pentamine, hexamethylene diamine-cinnamaldehyde adduct, hexamethylene diamine-dibenzoate salt, and other aliphatic polyvalent amines; 4,4'-methylene dianiline, 4,4'-oxydiphenylamine, m-phenylene diamine, p-phenylenediamine, 4,4'-methylene bis(o-chloroaniline), and other aromatic polyvalent amines; dihydrazide isophthalate, dihydrazide adipate, dihydrazide sebacate, and other compounds having two or more hydrazide structures; etc. may be mentioned.

The amount of the cross-linking agent blended is, with respect to the highly saturated nitrile rubber (A) as 100 parts by weight, preferably 0.2 to 20 parts by weight, more preferably 0.5 to 15 parts by weight.

Further, the cross-linkable rubber composition of the present invention may have blended into it, in addition to a cross-linking agent, other compounding agents usually used in the rubber processing field such as carbon black, zinc acrylate, zinc methacrylate, and other reinforcing fillers; calcium carbonate, clay, and other nonreinforcing fillers, antioxidants, light stabilizers, primary amines and other anti-scorching agents, plasticizer, working aids, lubricants, adhesives, lubricating agents, flame retardants, acid acceptors, anti-fungal agents, anti-static agents, coloring agents, silane coupling agents, cross-linking accelerators, cross-linking aids, cross-linking retarders, etc. The amounts of these compounding agents may be suitably selected in accordance with the objective of adding them.

The cross-linking agent and other compounding agents are preferably mixed with the highly saturated nitrile rubber (A) in a nonaqueous system. The mixing method is not particularly limited, but usually the ingredients other than the cross-linking agent and thermally unstable cross-linking accelerator etc. are mixed on a primary basis by a Bambury mixer, intermixer, kneader, or other mixer, then transferred to a roll etc., given the cross-linking agent etc., and kneaded on a secondary basis.

The Mooney viscosity of the cross-linkable rubber composition of the present invention [$ML_{1+4}$(100° C.)] (compound Mooney) is preferably 15 to 150, more preferably 40 to 120.

Rubber Cross-Linked Product

The rubber cross-linked product of the present invention can be obtained by cross-linking the above cross-linkable rubber composition.

In obtaining the rubber cross-linked product of the present invention, a molding machine in accordance with the desired shape, for example, an extruder, injection molding machine, or press is preferably used for cross-linking simultaneously with molding. Particularly, the cross-linkable rubber composition of the present invention is comprised of the highly saturated nitrile rubber (A) of the present invention, so even when cross-linked simultaneously with molding at a high temperature in a short time using an injection molding machine, press, etc., since it is superior in release property, residue will not easily deposit and build up in the mold. Further, as a result, even when repeatedly using a mold, it is possible to effectively prevent fouling of the mold by residue.

For this reason, in the present invention, for example, it is possible to use an injection molding machine, press, etc. for cross-linking simultaneous with molding under conditions of a high temperature and a short time. Since the mold is hard to foul even in this case, improvement of the productivity becomes possible. Note that, the molding and cross-linking temperature at that time are preferably 100 to 210° C., more preferably 130 to 200° C., and the molding and cross-linking time are preferably 30 seconds to 30 minutes, more preferably 1 minute to 10 minutes.

Further, depending on the shape, size, etc. of the rubber cross-linked product, even if the surface is cross-linked, the inside may not be sufficiently cross-linked in some cases, so further heating may be performed for secondary cross-linking.

The thus produced rubber cross-linked product of the present invention is improved in mold release and mold fouling resistance in the molding process and superior in productivity, while maintaining good normal state physical properties and heat resistance, in addition to being superior in properties of the nitrile group-containing highly saturated copolymer rubber such as the oil resistance and ozone resistance. For this reason, the rubber cross-linked product of the present invention can be suitably used for belts, seal members, rolls, hoses, tubes, etc. and can be particularly suitably used as seal members.

Note that, as seal members, seal members used for sealing solutions containing alcohol, particularly, packings for ink cartridges used for ink jet type recording apparatus (for example, packings attached to ink discharge ports so as to secure air-tightness between the ink discharge ports and hollow needles when inserting hollow needles formed in ink feed paths of ink jet type recording apparatus body into such ink discharge ports).

Further, as belts, flat belts, V-belts, V-ribbed belts, round belts, angle belts, toothed belts, etc. may be mentioned. As hoses, single tube rubber hoses, multilayer rubber hoses, braid reinforced hoses, wrapped reinforced hoses, etc. may be mentioned. As diaphragms, flat diaphragms, rolling diaphragms, etc. may be mentioned.

As seal members, rotary, rocking, reciprocating, and other moving seals and stationary seals may be mentioned. As moving seals, oil seals, piston seals, mechanical seals, boots, dust covers, diaphragms, accumulator bladders, etc. may be mentioned. As stationary seals, O-rings, various types of gaskets, etc. may be mentioned.

As rolls, rolls used as parts of printers, copiers, and other office equipment; spinning use extension rolls, spinning use draft rolls, and other textile processing rolls; bridle rolls, snubber rolls, steering rolls, or other steel rolls; etc. may be mentioned.

In addition, use for valves and valve seats, BOP (Blow Out Preventers), platters and other oil field use rubber parts, cushion members, vibration proofing materials or other attenuating rubber parts, automobile interior parts, shoe soles, and other wide applications is possible.

EXAMPLES

Below, the present invention will be explained based on more detailed examples, but the present invention is not limited to these examples. The "parts" in the present examples are based on weight unless otherwise specially indicated. Note that the tests and evaluations were based on the following.

Amount of Caprate (Amount of Tallowate)

The amounts of caprate (Examples 1 to 3) and the amount of tallowate (Comparative Example 1) in the highly saturated nitrile rubber were measured by the following method.

That is, using a mixed solution of ethanol and toluene (ethanol 70 vol %, toluene 30 vol %) as an extraction solution, the same method as in JIS K6237 (titration by sodium hydroxide and hydrochloric acid using indicator) was used to find the amounts of caprate or amount of tallowate and thereby find the weight ratios of the amounts of caprate or amount of tallowate extracted (unit: wt %) with respect to the weight of the highly saturated nitrile rubber before extraction. Note that, from the results of atomic absorption spectrometry, these were calculated as the magnesium caprate in Examples 1 and 2, aluminum caprate in Example 3, and magnesium tallowate in Comparative Example 1.

Further, the presences of tallow acid and capric acid and their ratios were confirmed by gas chromatography.

Iodine Value

The iodine value was measured in accordance with JIS K6235.

Mooney Viscosity [$ML_{1+4}(100°$ C.$)$]

The Mooney viscosity of the highly saturated nitrile rubber (polymer Mooney) and the Mooney viscosity of the cross-linkable rubber composition (compound Mooney) were measured in accordance with JIS K6300.

Mold Fouling Resistance

The obtained not yet cross-linked cross-linkable rubber composition was packed into a 12 mm diameter hole formed in a 2 mm thick metal sheet. The metal sheet packed with this not yet cross-linked cross-linkable rubber composition in its hole was clamped from above and below by two polished surface 1 mm thick metal sheets (JIS G3141 soft steel sheets). The composition was cross-linked under at 195° C. and 55 kg/cm$^2$ for 2.5 minutes. Next, the rubber piece obtained by the cross-linking was removed and not yet cross-linked cross-linkable rubber composition was again packed into the 12 mm diameter hole and the same operation repeated. Further, the surfaces of the top and bottom soft steel sheets were evaluated for fouling after the repeated operations. Note that, the fouling of the soft steel sheet surface was evaluated at the end points of the first, fifth, 10th, and 20th repeated operations. Further, the evaluation criteria were as follows.

1: No fouling of surfaces of soft steel sheets can be confirmed.

3: Fouling of surfaces of soft steel sheets can be clearly confirmed.

5: Fouling spreads on surfaces of soft steel sheets and fouling builds up.

Normal State Physical Properties (Tensile Strength, Elongation)

First, the cross-linkable rubber composition was placed in a mold of a length of 15 cm, width of 15 cm, and depth of 0.2 cm, cross-linked, and secondarily cross-linked in a gear oven to prepare a test piece of a rubber cross-linked product. Note that, the cross-linking conditions when preparing the test piece were, in Example 1, Example 3, and Comparative Example 1, 160° C., 20 minutes, and a press pressure of 10 MPa and, in Example 2, 170° C., 20 minutes, and a press pressure of 10 MPa. Next, the obtained test piece was used for measurement of the tensile strength and elongation according to JIS K6251.

Example 1

Inside a metal bottle, 0.2 part of sodium carbonate was dissolved in 200 parts of ion exchanged water. To this, potassium caprate was added in 2.5 parts to prepare a soap aqueous solution. Further, as a dispersant, a naphthalene sulfonate formaldehyde condensate was added in 1.0 part. To this, acrylonitrile in 37 parts and t-dodecyl mercaptan (molecular weight adjuster) in 0.5 part were charged in that order. The gas inside was replaced with nitrogen three times, then 1,3-butadiene in 63 parts was charged. Further, the metal bottle was held at 5° C. and cumen hydroperoxide (polymerization initiator) in 0.1 part and a reducing agent and chelating agent in suitable quantities were charged and a polymerization reaction caused for 16 hours while holding the temperature at 5° C. Next, a concentration 10 wt % hydroquinone (polymerization anticatalyst) aqueous solution in 0.1 part was added to stop the polymerization reaction and a water temperature 60° C. rotary evaporator was used to remove the residual monomer to obtain a latex of nitrile rubber. The obtained nitrile rubber was comprised of acrylonitrile monomer units in 37 wt % and butadiene monomer units in 63 wt % (results of analysis by $H^1$-NMR). The solid content concentration in the latex was 25 wt %.

Further, the above obtained latex was added to an aqueous solution containing 12 parts by weight of magnesium sulfate when designating the weight of the nitrile rubber component in the latex as 100 parts by weight. This was stirred to cause the latex to coagulate, then the result was washed with water and filtered, then dried in vacuo at 60° C. for 12 hours to obtain the nitrile rubber (a1).

Next, the obtained nitrile rubber (a1) was dissolved in acetone to a concentration of 12 wt % and placed in an autoclave, an amount of palladium-silica catalyst to give an amount of Pd metal becoming 1000 weight ppm with respect to the weight of the nitrile rubber (a1) was added, and a hydrogenation reaction was performed at 3.0 MPa. After the end of the hydrogenation reaction, the result was poured into a large amount of water to cause it to coagulate, then was filtered and dried to obtain the highly saturated nitrile rubber (A1) (results of analysis by $H^1$-NMR: acrylonitrile monomer units in 37 wt %, butadiene monomer units in 63 wt %, where the butadiene monomer units are the total of the hydrogenated parts and unhydrogenated parts).

To the highly saturated nitrile rubber (A1) obtained by the above method as 100 parts by weight, SRF carbon black (Asahi #50, made by Asahi Carbon) in 60 parts by weight, a plasticizer (Adeka Cizer C-8, made by ADEKA) in 8 parts, stearic acid in 1 part, Zinc White No. 1 in 5 parts, an amine-ketone-based antiaging agent (Nocrac 224, made by Ouchi Shinko Chemical Industry) in 1.5 parts, a benzoimidazole-based antiaging agent (Nocrac MBZ, made by Ouchi Shinko Chemical Industry) in 1.5 parts, #325 mesh sieved powdered sulfur (S#325, made by Hosoi Chemical Industry) in 0.8 part, a thiuram-based cross-linking accelerator (TMTD (Noccelar TT, made by Ouchi Shinko Chemical Industry)) in 1.5 parts, and a sulphenamide-based cross-linking accelerator (CBS (Noccelar CZ, made by Ouchi Shinko Chemical Industry)) in 0.5 part were blended, mixed, and kneaded using a roll at 50° C. to obtain a cross-linkable rubber composition.

Further, in accordance with the above methods, the amount of magnesium caprate salt, iodine value, and Mooney viscosity (polymer Mooney) of the above prepared highly saturated nitrile rubber (A1), the Mooney viscosity (compound Mooney) of the cross-linkable rubber composition, and the normal state physical properties (tensile strength, elongation) of the rubber cross-linked product were evaluated. Further, the mold fouling resistance when using the cross-linkable rubber composition was evaluated. The results are shown in Table 1.

Example 2

Except for extending the hydrogenation time in Example 1, the same procedure was followed as in Example 1 to obtain highly saturated nitrile rubber (A2) (results of analysis by $H^1$-NMR: acrylonitrile monomer units in 37 wt %, butadiene monomer units in 63 wt %, where the butadiene monomer units are the total of the hydrogenated parts and unhydrogenated parts).

Next, the obtained highly saturated nitrile rubber (A2) was used to prepare a cross-linkable rubber composition. In Example 2, instead of the amine-ketone-based antiaging agent (Nocrac 224) in 1.5 parts, a substituted diphenylamine-based antiaging agent (Naugard 445, made by Crompton) in 1.5 parts was used, and instead of the #325 mesh sieved powdered sulfur (S#325, made by Hosoi Chemical Industry) in 0.8 part, thiuram-based cross-linking accelerator (TMTD (Noccelar TT, made by Ouchi Shinko Chemical Industry)) in 1.5 parts, and sulphenamide-based cross-linking accelerator (CBS (Noccelar CZ, made by Ouchi Shinko Chemical Industry)) in 0.5 part, an organic peroxide-based cross-linking agent of α,α-bis[t-butylperoxy]diisopropylbenzene (Vul-Cup 40KE, made by GEO Specialty Chemicals Inc.) in 7 parts was used. Otherwise, the same procedure was followed as in Example 1 to prepare a cross-linkable rubber composition.

Further, the highly saturated nitrile rubber (A2), cross-linkable rubber composition, and rubber cross-linked product were evaluated in the same way as in Example 1. The results are shown in Table 1.

Example 3

Except for changing the coagulant in Example 1 to aluminum sulfate, the same procedure was followed as in Example 1 to obtain highly saturated nitrile rubber (A3) (results of analysis by $H^1$-NMR: acrylonitrile monomer units in 37 wt %, butadiene monomer units in 63 wt %, where the butadiene monomer units are the total of the hydrogenated parts and unhydrogenated parts). Further, the highly saturated nitrile rubber (A3), cross-linkable rubber composition, and rubber cross-linked product were evaluated in the same way as in Example 1. The results are shown in Table 1.

Comparative Example 1

Except for replacing the 2.5 parts potassium caprate in Example 1 to the same amount of saponified tallow, the same procedure was followed as in Example 1 to obtain a latex of nitrile rubber (a4). The obtained nitrile rubber (a4) was comprised of acrylonitrile monomer units in 37 wt % and butadiene monomer units in 63 wt %. The solid content concentration in the latex was 25 wt %. Note that, the tallowate was prepared by saponification of tallow (Lunac TH, made by Kao Corporation, saturated fatty acid $C_{14}$=4%, $C_{16}$=27%, $C_{18}$=24%, unsaturated fatty acid $C_{16}'$=5%, $C_{18}'$=40%) by KOH.

Next, the obtained nitrile rubber (a4) was subjected to a hydrogenation reaction in the same way as in Example 1 to obtain a highly saturated nitrile rubber (A4) (results of analysis by $H^1$-NMR: acrylonitrile monomer units in 37 wt %, butadiene monomer units in 63 wt %, where the butadiene monomer units are the total of the hydrogenated parts and unhydrogenated parts). This was evaluated in the same way as in Example 1. The results are shown in Table 1.

TABLE 1

|  |  | Examples | | | Comp. ex. |
| --- | --- | --- | --- | --- | --- |
|  |  | 1 | 2 | 3 | 1 |
| Formulation (parts) | Highly saturated nitrile rubber (A1) | 100 | | | |
| | Highly saturated nitrile rubber (A2) | | 100 | | |
| | Highly saturated nitrile rubber (A3) | | | 100 | |
| | Highly saturated nitrile rubber (A4) | | | | 100 |
| | Asahi #50 | 60 | 60 | 60 | 60 |
| | Adeka Cizer C-8 | 8 | 8 | 8 | 8 |
| | Stearic acid | 1 | 1 | 1 | 1 |
| | Zinc White No. 1 | 5 | 5 | 5 | 5 |
| | Nocrac 224 | 1.5 | | 1.5 | 1.5 |
| | Naugard 445 | | 1.5 | | |
| | Nocrac MBZ | 1.5 | 1.5 | 1.5 | 1.5 |
| | TMTD (TT) | 1.5 | | 1.5 | 1.5 |
| | CBS (CZ) | 0.5 | | 0.5 | 0.5 |
| | S#325 | 0.8 | | 0.8 | 0.8 |
| | Vulcup40KE | | 7 | | |
| Iodine value | | 17 | 11 | 17 | 17 |
| Polymer Mooney viscosity | [$ML_{1+4}$(100° C.)] | 86 | 87 | 85 | 80 |
| Amount of caprates in rubber | (wt %) | 0.1 | 0.1 | 0.3 | 0 |
| Amount of tallowate in rubber | (wt %) | 0 | 0 | 0 | 0.5 |
| Compound Mooney viscosity | [$ML_{1+4}$(100° C.)] | 99.1 | 99.5 | 99.1 | 89.4 |
| Mold fouling resistance | (1st time) | 1 | 1 | 1 | 1 |
| | (5th time) | 1 | 1 | 1 | 3 |
| | (10th time) | 1 | 1 | 1 | 5 |
| | (20th time) | 1 | 1 | 3 | 5 |
| Tensile strength (*) | (MPa) | 22.1 | 22 | 21.5 | 22.2 |
| Elongation (*) | (%) | 630 | 440 | 620 | 650 |

(*) In Examples 1 and 3 and Comp. Ex. 1, a rubber cross-linked product obtained by cross-linking at 160° C. for 20 minutes at 10 MPa was used, while in Example 2, a rubber cross-linked product obtained by cross-linking at 170° C. for 20 minutes at 10 MPa was used.

Note that, in Table 1, "Asahi #50" is SRF carbon black, "Adeka Cizer C-8" is a plasticizer, "Nocrac 224" is an amine-ketone-based antiaging agent, "Naugard 445" is a substituted diphenylamine-based antiaging agent, "Nocrac MBZ" is a benzoimidazole-based antiaging agent, "TMTD (TT)" is a thiuram-based cross-linking accelerator, "CBS (CZ)" is a sulphenamide-based cross-linking accelerator, "S#325" is a #325 mesh sieved powdered sulfur, and "VulCup 40KE" is α,α-bis[t-butylperoxy]diisopropylbenzene.

As shown in Table 1, in Examples 1 to 3 where the amount of the caprate in the highly saturated nitrile rubber was made 0.01 to 0.4 wt %, it was possible to effectively prevent mold fouling in the molding process and possible to obtain good normal state physical properties for the obtained rubber cross-linked product.

As opposed to this, in Comparative Example 1 using a saponified tallowate instead of a caprate, mold fouling occurred in the molding process.

The invention claimed is:

1. A nitrile group-containing highly saturated copolymer rubber having an iodine value of 80 or less and containing a caprate, wherein a content of the caprate, measured by the same method as in JIS K6237 is 0.01 to 0.4 wt %.

2. The nitrile group-containing highly saturated copolymer rubber as set forth in claim 1, wherein said caprate is an alkaline earth metal caprate or Group XIII metal caprate.

3. The nitrile group-containing highly saturated copolymer rubber as set forth in claim 2, wherein said caprate is magnesium caprate or aluminum caprate.

4. The nitrile group-containing highly saturated copolymer rubber as set forth in claim 1, wherein said nitrile group-containing highly saturated copolymer rubber is one produced by coagulating a latex of the nitrile group-containing copolymer rubber obtained by emulsion polymerization using a caprate, then performing a hydrogenation reaction.

5. The nitrile group-containing highly saturated copolymer rubber as set forth in claim 4, wherein said nitrile group-containing highly saturated copolymer rubber is one produced by coagulating a latex of the nitrile group-containing copolymer rubber obtained by emulsion polymerization using a caprate, using alkali earth metal salt or Group XIII metal salt, then performing a hydrogenation reaction.

6. A cross-linkable rubber composition containing a nitrile group-containing highly saturated copolymer rubber as set forth in claim 1 and a cross-linking agent.

7. A rubber cross-linked product obtained by cross-linking a cross-linkable rubber composition as set forth in claim 6.

8. The rubber cross-linked product as set forth in claim 7, used as a seal material.

9. A method of production of a nitrile group-containing highly saturated copolymer rubber having an iodine value of 80 or less, comprising:
   a step of emulsion polymerization using a caprate to obtain a latex of a nitrile group-containing copolymer rubber,
   a step of using an alkali earth metal salt or Group XIII metal salt to make said latex of a nitrile group-containing copolymer rubber coagulate to obtain a nitrile group-containing copolymer rubber, and
   a step of a hydrogenation reaction of said nitrile group-containing copolymer rubber.

* * * * *